(12) United States Patent
Shen

(10) Patent No.: US 12,108,160 B2
(45) Date of Patent: Oct. 1, 2024

(54) METHOD AND APPARATUS FOR ADJUSTING CAMERA GAIN, AND SCANNING SYSTEM

(71) Applicant: SHINING 3D TECH CO., LTD., Zhejiang (CN)

(72) Inventor: Song Shen, Zhejiang (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

(21) Appl. No.: 18/023,735

(22) PCT Filed: Aug. 20, 2021

(86) PCT No.: PCT/CN2021/113851
§ 371 (c)(1),
(2) Date: Apr. 18, 2023

(87) PCT Pub. No.: WO2022/048460
PCT Pub. Date: Mar. 10, 2022

(65) Prior Publication Data
US 2024/0040261 A1 Feb. 1, 2024

(30) Foreign Application Priority Data
Sep. 1, 2020 (CN) .......................... 202010904621.8

(51) Int. Cl.
*H04N 23/71* (2023.01)
*G06T 15/04* (2011.01)
*H04N 23/667* (2023.01)

(52) U.S. Cl.
CPC ............. *H04N 23/71* (2023.01); *G06T 15/04* (2013.01); *H04N 23/667* (2023.01); *G06T 2210/56* (2013.01)

(58) Field of Classification Search
CPC ...... H04N 23/71; H04N 23/667; H04N 23/76; H04N 5/20; H04N 5/202; G06T 15/04; G06T 2210/56
See application file for complete search history.

(56) References Cited

U.S. PATENT DOCUMENTS

| 6,511,426 B1 | 1/2003 | Hossack et al. |
| 8,326,084 B1 | 12/2012 | Marrion, Jr. |
| 8,698,831 B2 | 4/2014 | Kato et al. |

(Continued)

FOREIGN PATENT DOCUMENTS

| CN | 109584352 A | 4/2019 |
| CN | 109883354 A | 6/2019 |

(Continued)

OTHER PUBLICATIONS

Extended European search report of EP application No. 21863527.4 issued on Jan. 30, 2024.

*Primary Examiner* — Yogesh K Aggarwal
(74) *Attorney, Agent, or Firm* — Samson G. Yu

(57) ABSTRACT

The embodiments of the disclosure disclose a method and device for adjusting camera gain and a scanning system. The method includes: collecting a current frame image of a to-be-detected object; selecting a preset region in the current frame image for grayscale calculation to obtain a first calculation result; and adjusting camera gain in a corresponding brightness adjustment period based on the first calculation result.

13 Claims, 8 Drawing Sheets

(56) References Cited

U.S. PATENT DOCUMENTS

| | | |
|---|---|---|
| 2007/0262985 A1 | 11/2007 | Watanabe |
| 2013/0235163 A1 | 9/2013 | Joo |
| 2017/0353707 A1 | 12/2017 | Wang et al. |
| 2019/0099455 A1 | 4/2019 | McKenzie et al. |
| 2019/0156515 A1 | 5/2019 | Deng et al. |
| 2020/0162655 A1* | 5/2020 | Zhou .................. H04N 23/71 |
| 2021/0192698 A1* | 6/2021 | Yang .................. H04N 23/71 |

FOREIGN PATENT DOCUMENTS

| | | |
|---|---|---|
| CN | 111372008 A | 7/2020 |
| CN | 111405264 A | 7/2020 |
| CN | 112040091 A | 12/2020 |

\* cited by examiner

METHOD AND APPARATUS FOR ADJUSTING CAMERA GAIN, AND SCANNING SYSTEM

The embodiments of the disclosure claim the benefit of priority of Chinese patent application No. 202010904621.8, entitled "METHOD AND DEVICE FOR ADJUSTING CAMERA GAIN AND SCANNING SYSTEM", filed to China National Intellectual Property Administration on Sep. 1, 2020, the entire contents of which are incorporated herein by reference.

TECHNICAL FIELD

The embodiments of the disclosure relate to the field of image processing, and more particularly relate to a method and device for adjusting camera gain and a scanning system.

BACKGROUND

During to-be-detected object scanning, for example, when an intraoral scanner scans a to-be-detected object, integral brightness of a scanned three-dimensional model is required to be within a reasonable range and not to have obvious uneven brightness and overexposure phenomena. To satisfy the foregoing requirements, camera gain can be adjusted in the scanning process. Since single frame data transmitted to a computer terminal by the intraoral scanner is composed of reconstruction patterns and texture patterns, the image quality in the two aspects needs to be combined for gain adjustment.

There are two methods for adjusting camera gain at present. According to a first method, manual adjustment is adopted, and it is manually judged whether image brightness and overexposure control are qualified or not. According to a second method, target brightness is set for a camera, a plurality of pictures are shot continuously, average brightness is calculated, an adjustment amount of gain is determined according to a difference between the average brightness and the target brightness, and then adjustment is performed again till the difference is small enough. But the existing two methods for adjusting camera gain both have problems of being poor in flexibility, resulting in inaccurate scanning results.

There are still no effective solutions for the foregoing problems.

SUMMARY

According to one aspect of the embodiments of the disclosure, a method for adjusting camera gain is provided, and includes: collecting a current frame image of a to-be-detected object; selecting a preset region in the current frame image for grayscale calculation to obtain a first calculation result; and adjusting camera gain in a corresponding brightness adjustment period based on the first calculation result.

Alternatively, the preset region is a successful reconstruction region in the current frame image, and before selecting the preset region in the current frame image for grayscale calculation, the method further includes: performing three-dimensional reconstruction on the current frame image of the to-be-detected object; and if reconstruction succeeds, selecting the successful reconstruction region in the current frame image for grayscale calculation to obtain the first calculation result.

Alternatively, the step of selecting the successful reconstruction region in the current frame image for grayscale calculation to obtain the first calculation result includes: obtaining a grayscale image of the current frame image based on a grayscale value of each pixel point in the successful reconstruction region in the current frame image, where the grayscale value is a weighted mean of grayscale values of three channels of each pixel point; calculating a grayscale mean of all the pixel points in the preset region in the grayscale image, and counting a target quantity of the pixel points with the grayscale value greater than a first preset value in the successful reconstruction region; and obtaining the first calculation result based on the grayscale mean of all the pixel points and the target quantity, where the first calculation result includes: a current grayscale long-term mean, a grayscale short-term mean and an overexposure point proportion long-term mean of the image.

Alternatively, a weighted value corresponding to a target channel in the three channels is greater than weighted values corresponding to the other two channels, and the target channel is a channel corresponding to reconstruction light projected to the to-be-detected object.

Alternatively, the brightness adjustment period includes one of an initial adjustment period, a stable period and an abnormal period. Corresponding adjustment modes are adopted in the different brightness adjustment periods to adjust camera gain, where if a scene in the current frame image changes, the brightness adjustment period is marked as the abnormal period.

Alternatively, in a case that the brightness adjustment period is the initial adjustment period, the step of adjusting camera gain in a corresponding brightness adjustment period based on the first calculation result includes: verifying whether the initial adjustment period overruns or not; if not, verifying whether a difference value between the grayscale short-term mean and a first set value is within a first set range or not; if not within the first set range, adopting a universal adjustment mode to adjust camera gain, and keeping the brightness adjustment period as the initial adjustment period; if within the first set range, keeping camera gain unchangeable, marking the brightness adjustment period as the stable period, and ending the initial adjustment period; and if overrun, adopting the universal adjustment mode to adjust camera gain, marking the brightness adjustment period as the abnormal period, and ending the initial adjustment period.

Alternatively, in a case that the brightness adjustment period is the abnormal period, the step of adjusting camera gain in a corresponding brightness adjustment period based on the first calculation result includes: verifying whether the abnormal period overruns or not; if not, verifying whether a difference value between the grayscale short-term mean and a first set value is within a first set range or not: if not within the first set range, adopting a universal adjustment mode to adjust camera gain, and verifying whether an adjustment amount exceeds a second preset value or not; if the adjustment amount is the second preset value, marking the brightness adjustment period as the stable period, and ending the abnormal period; and if the adjustment amount is not the second preset value, keeping the brightness adjustment period as the stable period; and if within the first set range, keeping camera gain unchangeable, marking the brightness adjustment period as the stable period, and ending the abnormal period; and if overrun, adopting the universal adjustment mode to adjust camera gain, marking the brightness adjustment period as the stable period, and ending the abnormal period.

Alternatively, in a case that the brightness adjustment period is the stable period, the step of adjusting camera gain in a corresponding brightness adjustment period based on the first calculation result includes: verifying whether a difference value between the grayscale long-term mean and a third set value is within a third set range or not: if within the third set range, verifying whether the overexposure point proportion long-term mean exceeds a fourth set value or not; if the fourth set value is exceeded, lowering camera gain, and keeping the brightness adjustment period as the stable period; and if the fourth set value is not exceeded, keeping camera gain unchangeable, and keeping the brightness adjustment period as the stable period; and if not within the third set range, adopting the universal adjustment mode to adjust camera gain, and verifying whether an adjustment amount exceeds a fifth set value or not; if the adjustment amount exceeds the fifth set value, marking the brightness adjustment period as the abnormal period, and ending the stable period; and if the adjustment amount does not exceed the fifth set value, keeping the brightness adjustment period as the stable period.

Alternatively, the step of adopting a universal adjustment mode to adjust camera gain includes: obtaining an adjustment amount of gain based on the grayscale short-term mean and the first set value; verifying whether the adjustment amount is the second preset value or not; if the adjustment amount is the second preset value, keeping camera gain unchangeable; and if the adjustment amount is not the second preset value, reversely adjusting camera gain based on the adjustment amount.

Alternatively, before selecting the successful reconstruction region in the current frame image for grayscale calculation, it is judged whether the number of previous frames continuously failing in reconstruction reaches the preset value or not; if yes, after the first calculation result calculated before is removed, grayscale calculation is started from the current frame image; and if not, grayscale calculation is performed based on the current frame image and the first calculation result calculated before.

Alternatively, if reconstruction fails, a non-dark region in the current frame image is selected for grayscale calculation to obtain a second calculation result, where the second calculation result includes a grayscale value and an overexposure point proportion of the current frame image; it is verified whether the number of pixel points in the non-dark region is less than a sixth set value or not; if the number is less than the sixth set value, camera gain is kept unchangeable; and if the number is greater than the sixth set value, it is verified whether the overexposure point proportion exceeds a seventh set value or not: if the seventh set value is exceeded, a universal adjustment mode is adopted to adjust camera gain; and if the seventh set value is not exceeded, camera gain is kept unchangeable.

According to another aspect of the embodiments of the disclosure, an device for adjusting camera gain is further provided, and includes: an acquisition module configured to collect a current frame image of a to-be-detected object; a calculation module configured to select a preset region in the current frame image for grayscale calculation to obtain a first calculation result; and a processing module configured to adjust camera gain in a corresponding brightness adjustment period based on the first calculation result.

According to another aspect of the embodiments of the disclosure, a scanning system is further provided, and includes: a scanner including a projector and a camera, the projector being configured to project monochromatic light to a to-be-detected object, and the camera being configured to collect a reconstruction pattern and a texture pattern of the to-be-detected object according to first gain; and a computer which is connected to the camera, and is configured to perform three-dimensional reconstruction based on the reconstruction pattern and the texture pattern, perform grayscale calculation based on the reconstruction pattern and the texture pattern to obtain a first calculation result and determine adjusted second gain based on the first calculation result in a corresponding brightness adjustment period, where the camera is further configured to collect a reconstruction pattern and a texture pattern of the to-be-detected object according to the second gain.

According to another aspect of the embodiments of the disclosure, a computer-readable storage medium is further provided and includes stored programs. The programs, when operating, control a device where the storage medium is located to execute any above method for adjusting camera gain.

According to another aspect of the embodiments of the disclosure, a processor is further provided and configured to operate programs. The programs, when operating, execute any foregoing method for adjusting camera gain.

BRIEF DESCRIPTION OF THE DRAWINGS

Drawings illustrated herein are used for providing further understanding for the present disclosure and constitute a part of the present application. Schematic embodiments of the present disclosure and explanations thereof are used for explaining the present disclosure, which do not constitute improper limits to the present disclosure. In the drawings.

DETAILED DESCRIPTION OF THE EMBODIMENTS

For the purpose of making those skilled in the art better understand the embodiments of the disclosure, technical schemes in embodiments of the present disclosure are clearly and completely described in conjunction with drawings in the embodiments of the present disclosure as below, and obviously, the ones described herein are merely a part of the embodiments of the present disclosure and not all the embodiments. Based on the embodiments of the present disclosure, all other embodiments obtained by those of ordinary skill in the art without creative work fall within the scope of protection of the present disclosure.

It needs to be explained that terms such as "first" and "second" in Description and Claims of the present disclosure and the foregoing drawings are used for distinguishing similar objects but not necessarily used for describing specific sequences or precedence orders. It should be understood that adopted data can be exchanged under a proper situation so as to implement the embodiments, described herein, of the present disclosure in sequence except the illustrated or described sequences. In addition, terms "include" and "have" and any transformations thereof are intended to cover non-exclusive inclusion, for example, a process, a method, a system, a product or a device including a series of steps or units is not limited to clearly-listed steps or units, while may include unclearly-listed other steps or units or other inherent steps or units of the process, the method, the product or the device.

Embodiment 1

According to the embodiment of the present disclosure, a method embodiment for adjusting camera gain is provided. It needs to be explained that steps shown in a flowchart of the drawings may be performed in a computer system with a set of computer executable instructions. In addition, although a logical sequence is shown in the flowchart, the illustrated or described steps may be performed in sequence different from the sequence herein under some situations.

The embodiments of the disclosure provide a method and device for adjusting camera gain and a scanning system, so as to at least solve technical problems that in related technologies, a method for adjusting camera gain is poor in flexibility, resulting in inaccurate scanning results.

Figure 1:
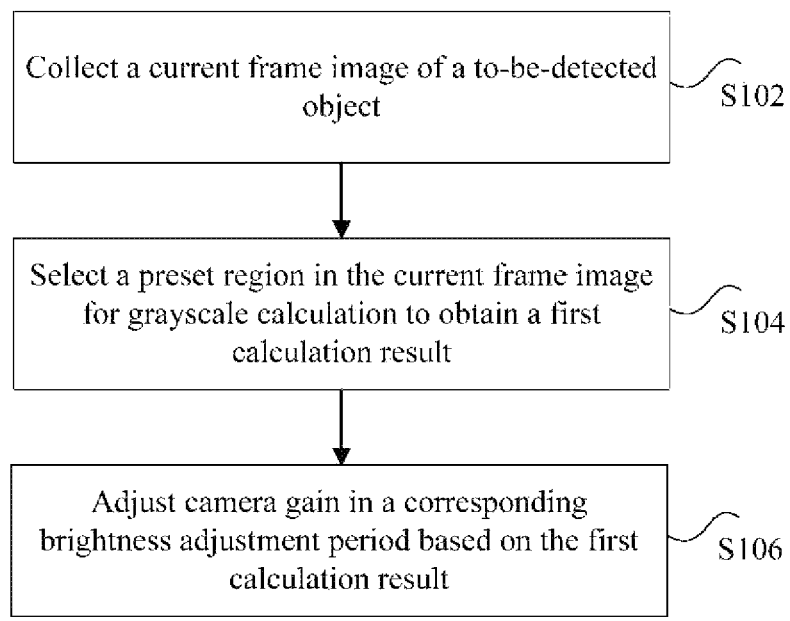
FIG. 1 is a flowchart of a method for adjusting camera gain according to an embodiment of the present disclosure.

FIG. 1 is a flowchart of a method for adjusting camera gain according to an embodiment of the present disclosure. As shown in FIG. 1, the method includes following steps:

S102: A current frame image of a to-be-detected object is collected.

Specifically, the foregoing to-be-detected object may be an object scanned by a camera (e.g., an intraoral scanner), such as a model and an actual object, but is not limited thereto. The foregoing current frame image may be an image transmitted to a computer terminal by the camera, including a reconstruction pattern and a texture pattern. For the reconstruction pattern, a projector first projects reconstruction light (e.g., blue light) stripes to a surface of the to-be-detected object, then, the camera adopts first gain (gain before adjustment) to shoot the to-be-detected object (e.g., the blue light being collected for a blue channel), and an obtained image is a stripe pattern. The foregoing operation is repeated by adopting same-color light and changing stripe positions, thereby obtaining a set of stripe patterns, where the first gain refers to camera gain set before the camera collects the image of the to-be-detected object, or default gain of the camera. Three-dimensional coordinates of various points on the surface of the to-be-detected object in space can be reconstructed by the set of stripe patterns, that is, a point cloud pattern is obtained through three-dimensional reconstruction and thus, the set of stripe patterns are called the reconstruction pattern. For the texture pattern, the texture pattern may be simply synthesized by grayscale images of three channels (red, green and blue) of the camera, thus, the grayscale images of various channels are first acquired, then, light of three colors is sequentially projected, and the grayscale images corresponding to the colors are sequentially acquired. An acquiring manner for the grayscale images is similar to that of the single stripe pattern, but is only different in light projected by the projector being mono and uniform during grayscale image acquiring. The grayscale image corresponding to the light with which color projected by the projector serves as the corresponding channel of the texture pattern (e.g., when the blue light is projected, the obtained grayscale image is the blue channel). The color carried by three-dimensional coordinates of each reconstructed point can be known based on the texture pattern, which provides texture information for a reconstruction result.

Figure 2:
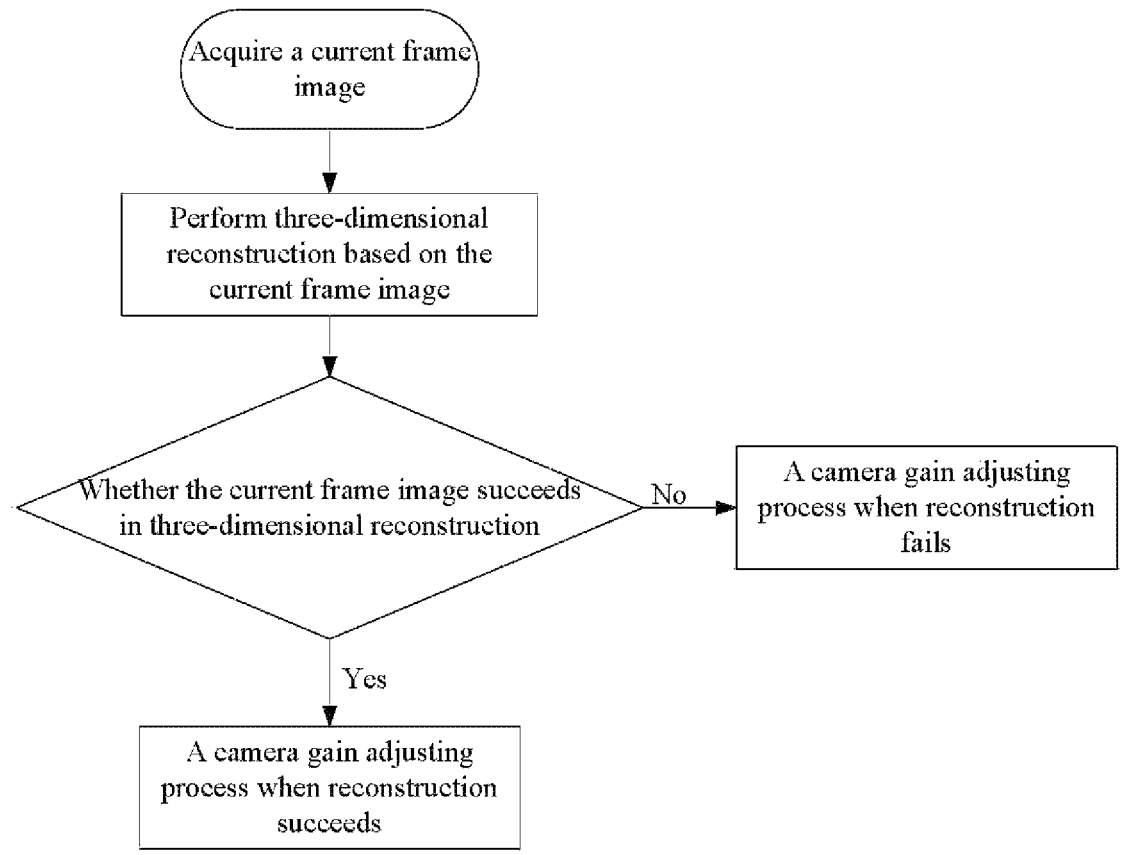
FIG. 2 is a flowchart of a method for adjusting camera gain according to an embodiment of the present disclosure.

In an optional scheme, as shown in FIG. 2, the current frame image is acquired, three-dimensional reconstruction is performed based on the current frame image, it is judged whether the current frame image succeeds in three-dimensional reconstruction or not, and if reconstruction succeeds, a process of adjusting camera gain when reconstruction succeeds is executed; and if reconstruction fails, a process of adjusting camera gain when reconstruction fails is executed.

It needs to be explained that the acquiring manners of the reconstruction pattern and the texture pattern show that the reconstruction pattern is a response to the monochromatic light channel, the texture pattern is a response to three-color light, and the integral brightness of the two parts is not consistent in gain response. For example, the blue light serves as stripe light used for reconstruction, when a blue model is scanned, due to a high reflectivity of the blue model to the blue light, the blue light is not too hard, the gain of the blue light required by the reconstruction pattern is low, and the gain of the blue light required by the texture pattern is high.

Considering the big difference between the reconstruction pattern and the texture pattern in image feature, the present disclosure focuses on model texture. For the reconstruction pattern, the brightness of the reconstruction pattern does not need to be involved in image feature analysis as long as the image reconstruction success rate is not obviously reduced, while the brightness of the channel corresponding to the reconstruction light of the texture pattern is used for image feature analysis. For example, the reconstruction light is the blue light, and the brightness of the blue channel of the texture pattern is used for reflecting brightness features of the reconstruction pattern.

S104: A preset region in the current frame image is selected for grayscale calculation to obtain a first calculation result.

Specifically, the foregoing preset region is a successful reconstruction region in the current frame image, which refers to a region where point clouds are obtained via three-dimensional reconstruction based on the reconstruction pattern in the current frame image. The region where the point clouds are reconstructed in the current frame reconstruction pattern and a region corresponding to the current frame texture pattern are both successful reconstruction regions in the current frame image, that is, the region corresponding to the current frame texture pattern is the successful reconstruction region in the current frame texture pattern. The foregoing first calculation result includes a grayscale value and an overexposure point proportion of the successful reconstruction region in the current frame image, a current grayscale short-period mean of the texture pattern, a current grayscale long-term mean of the texture pattern and a current overexposure point proportion long-term mean of the texture pattern, where the first calculation result is obtained through calculation preferably based on the successful reconstruction region in the current frame texture pattern.

In an optional embodiment, a current frame reconstruction pattern and a current frame texture pattern of a to-be-detected object are acquired via scanning, current frame point clouds are obtained through three-dimensional reconstruction based on the current frame reconstruction pattern, current frame texture is obtained through reconstruction based on the current frame texture pattern, and a successful reconstruction region in the current frame texture pattern is selected for grayscale calculation to obtain a first calculation result. The first calculation result includes a grayscale value of the successful reconstruction region in the current frame texture pattern (set as a brightness mean of the successful reconstruction region in the current frame texture pattern to measure brightness of the current frame texture pattern) and an overexposure point proportion (a proportion of the overexposure point number of the successful reconstruction region in the current frame texture pattern to the pixel point number of the successful reconstruction region in the current frame texture pattern, and overexposure points referring to pixel points with brightness exceeding a preset value), a current grayscale long-term mean of the texture pattern, a current grayscale short-term mean of the texture pattern, a current overexposure point proportion long-term mean of the texture pattern, etc.

S106: Camera gain is adjusted in a corresponding brightness adjustment period based on the first calculation result.

Specifically, the foregoing camera gain is a kind of parameter of the camera, which is an index embodying a degree of amplifying image signals by the camera, the higher the gain is, the higher the image brightness becomes. Gain adjustment refers to setting the gain parameter to the camera, so that during camera operating, the camera acquires an image reasonable in brightness.

In an optional embodiment, camera gain (i.e., the foregoing first gain) is adjusted according to different camera gain adjusting manners in different brightness adjustment periods to obtain second gain (adjusted gain) so that the camera can adopt the second gain (the adjusted gain) to shoot the to-be-detected object to obtain a new reconstruction pattern and a new texture pattern, based on which three-dimensional reconstruction is performed.

According to the foregoing embodiment, by adopting the manner that the current frame image of the to-be-detected object is collected; the preset region in the current frame image is selected for grayscale calculation to obtain the first calculation result; and based on the first calculation result, camera gain is adjusted in the corresponding brightness adjustment period, specific corresponding manners for adjusting camera gain are implemented according to different brightness adjustment periods to achieve purposes of improving a gain adjusting rate and an adjustment effect, thereby realizing a technical effect of improving the image scanning quality, and solving technical problems that in related technologies, the method for adjusting camera gain is poor in flexibility, resulting in inaccurate scanning results.

It needs to be explained that according to special requirements of the intraoral scanner for gain adjustment, the present disclosure designs automatic camera gain adjusting schemes for successful reconstruction and failed reconstruction respectively. Specific implementations in this embodiment are as below:

Alternatively, in the foregoing embodiment of the present disclosure, the preset region is the successful reconstruction region in the current frame image, and before selecting the preset region in the current frame image for grayscale calculation, the method further includes: performing three-dimensional reconstruction on the current frame image of the to-be-detected object; and if reconstruction succeeds, selecting the successful reconstruction region in the current frame image for grayscale calculation to obtain the first calculation result.

Alternatively, in the foregoing embodiment of the present disclosure, the step of selecting the successful reconstruction region in the current frame image for grayscale calculation to obtain the first calculation result includes: obtaining a grayscale image of the current frame image based on a grayscale value of each pixel point in the successful reconstruction region in the current frame image, where the grayscale value is a weighted mean of grayscale values of three channels of each pixel point; calculating a grayscale mean of all the pixel points in the preset region in the grayscale image, and counting a target quantity of the pixel points with the grayscale value greater than a first preset value in the successful reconstruction region; and obtaining the first calculation result based on the grayscale mean of all the pixel points and the target quantity, where the first calculation result includes: a current grayscale long-term mean, a grayscale short-term mean and an overexposure point proportion long-term mean of the image. Specifically, a blue channel of the camera acquires a blue monochrome, a red channel of the camera acquires a red monochrome, a green channel of the camera acquires a green monochrome, and the three monochromes are fused into the texture pattern, that is, the grayscale image of the texture pattern is obtained by performing weighted mean processing on a grayscale value of the blue monochrome, a grayscale value of the red monochrome and a grayscale value of the blue monochrome, where performing weighted mean processing on the grayscale values of the monochromes of the three colors refers to weighted mean processing on all the pixel points in the preset region. For example, weighted mean processing is performed on a pixel point A of the blue monochrome, a pixel point A of the red channel and a pixel point A of the green channel to obtain a grayscale value of a pixel point A of the texture pattern, and weighted mean processing is performed on a pixel point B of the blue monochrome, a pixel point B of the red channel and a pixel point B of the green channel to obtain a grayscale value of a pixel point B of the texture pattern.

Specifically, the foregoing first preset value is a grayscale threshold. The foregoing overexposure points refer to pixel points with grayscale values greater than the first preset value in the pixel points in the current frame image, where the number of the overexposure points (i.e., the overexposure point number) is the target quantity.

In an optional scheme, a weighted mean is solved for grayscales of three channels of each pixel point in a successful reconstruction region in a current frame texture pattern, so as to obtain a grayscale image of a current frame image. A mean of all pixel points in a preset region of the newly-obtained grayscale image serves as a grayscale value of the current frame image, and a proportion (i.e., an overexposure point proportion) of the overexposure point number to the number of the pixel points in the successful reconstruction region is counted. A corresponding long-term mean and a corresponding short-term mean are respectively calculated based on the grayscale value and the overexposure point proportion of the current frame image. The grayscale long-term mean of the current frame image is a grayscale mean of M frames of successfully-reconstructed images including the current frame and previous continuous M−1 frames (M is an integer greater than 1). For example, a grayscale mean of previous continuous 160 frames (M is 160) of successfully-reconstructed images including the current frame is a grayscale long-term mean of the current frame image, that is, the grayscale mean is obtained by averaging the grayscale values of the 160 frames of images. The grayscale short-term mean of the current frame image is a grayscale mean of N frames (N is an integer greater than 1 and less than M) of successfully-reconstructed images including the current frame and previous continuous N−1 frames. For example, a grayscale mean of previous continuous 3 frames (N is 3) of successfully-reconstructed images including the current frame is the grayscale short-term mean of the current frame image, that is, the grayscale mean is obtained by averaging the grayscale values of the 3 frames of images. The number of the frames of images continuously selected in a long term and a short term is decided according to actual demands, which is not limited herein; and in a similar way, the overexposure point proportion long-term mean is obtained, for example, the overexposure point proportion long-term mean of the current frame image is obtained by averaging overexposure point proportions of the 160 frames of images. It needs to be explained that the previous continuous 160 frames (M is 160) of the successfully-reconstructed images including the current frame may be 160 frames of images continuously successfully reconstructed without unsuccessful reconstruction, and may also be 160 frames of images continuously successfully reconstructed with unsuccessful reconstruction. For example, the current frame is a first frame, 1-157 frames before the current frame are all successfully-reconstructed frames, a $158^{th}$ frame is an unsuccessfully-reconstructed frame, a $159^{th}$ frame is a successfully-reconstructed frame, and thus, the previous continuous 160 frames (M is 160) of the successfully-reconstructed images including the current frame are composed of the current frame of image, the 1-157 frames of images before the current frame and the $159^{th}$ frame of image before the current frame but do not include the $158^{th}$ frame of image before the current frame. The short-term mean is in a similar way.

Alternatively, in the foregoing embodiment of the present disclosure, a weighted value corresponding to a target channel in the three channels is greater than weighted values corresponding to the other two channels, and the target channel is a channel corresponding to the reconstruction light projected to the to-be-detected object.

In an optional scheme, when the intraoral scanner is used, it is required to combine the reconstruction pattern and the texture pattern while the reconstruction pattern is a response to a reconstruction light single channel, that is, the reconstruction light single channel corresponding to the reconstruction pattern is the target channel, and thus, brightness adjustment on the channel is more important. Thus, a weight occupied by a texture channel corresponding to the reconstruction light is far greater than weights occupied by the other two channels. For example, when the target channel is a blue light channel, weights occupied by a red light channel, a green light channel and the blue light channel may be sequentially 0.25, 0.25 and 0.5.

Alternatively, in the foregoing embodiment of the present disclosure, the brightness adjustment period includes one of an initial adjustment period, a stable period and an abnormal period. Corresponding adjustment modes are adopted in the different brightness adjustment periods to adjust camera gain, where if a scene in the current frame image changes, the brightness adjustment period of the scanner is marked as the abnormal period.

Specifically, the initial adjustment period is a period when initial scanning is in an adjusting state, and the camera enters the initial adjustment period commonly when the first frame is successfully reconstructed; the stable period is a period when in an ideal state, the attribute of the scanned object is stable, and the gain is generally kept stable (without changes or small-range adjustment); and in the abnormal period, there may be a situation of a large adjustment range during adjustment in the stable period, which will influence an effect of scanned texture, and thus, the abnormal period is set to treat the situation.

It needs to be explained that in the scanning process of the intraoral scanner, the requirements in texture pattern brightness and overexposure control need to be satisfied, where for the brightness adjustment period, when the first frame is successfully reconstructed, the intraoral scanner will enter three different brightness adjustment periods, including: the initial adjustment period, the stable period and the abnormal period. Every time when reconstruction succeeds, only one of the three periods comes, there is no need to experience each period, and all the periods have different brightness adjusting requirements.

In an optional scheme, the intraoral scanner scans the scanned object to obtain two-dimensional images, and the plurality of two-dimensional images are subjected to three-dimensional reconstruction to obtain a three-dimensional reconstructed point cloud image. The gain of the camera is adjusted according to different brightness adjusting demands of different periods. The initial adjustment requires rapid adjustment on the image gain to a proper position, since three-dimensional reconstructed point cloud images in the adjusting process in the initial adjustment period are deemed to be disqualified and are not subjected to image splicing, where image splicing refers to a process of splicing the plurality of point cloud images into a whole, the adjusting duration cannot be too long, and the stable period comes after adjustment is qualified; in the stable period, camera gain is required to be kept unchangeable so as to keep brightness uniformity of an integral scanning effect, but the requirement is hard to satisfy in practical operation, thus, small-range and interrupted adjustment is needed, and three-dimensional reconstructed point cloud images acquired in the stable period are commonly deemed to be qualified and can be subjected to image splicing; and three-dimensional reconstructed point cloud images acquired in the abnormal period cannot be subjected to image splicing neither, and thus, the duration should be shorter than the time spent on initial adjustment, and the gain needs to be recovered to or approach a normal level as soon as possible. If it is judged that the scene changes, the previous frame fails in reconstruction, and when reconstruction fails, the adjustment period will be kept unchangeable, that is, when the previous frame is in the initial adjustment period, the next frame is still in the initial adjustment period, and when the previous frame is in the stable period, the next frame is still in the stable period. A judgment standard is as below: judging whether the number of frames continuously failing in reconstruction is greater than or equal to 8 or not, which can be adjusted according to practical situations, such as 10 frames, and is not limited herein. If the number of frames continuously failing in reconstruction is greater than or equal to 8, it is judged that the scene in the current frame image changes; and if the number of frames continuously failing in reconstruction is less than 8, it is judged that the scene in the current frame image does not change.

It needs to be explained that in the process of scanning the single to-be-detected object, the relative position between the scanner and the scanned to-be-detected object constantly changes, and thus integral grayscale of the texture pattern of the to-be-detected object constantly changes. But due to the relative stable scene, the change is within a certain range.

Alternatively, in the foregoing embodiment of the present disclosure, in a case that the brightness adjustment period is the initial adjustment period, an adjustment mode in the initial adjustment period is adopted to adjust camera gain. In a case that the brightness adjustment period is the initial adjustment period, the step of adjusting camera gain in a corresponding brightness adjustment period based on the first calculation result includes: verifying whether the initial adjustment period overruns or not; if not, verifying whether a difference value between the grayscale short-term mean and a first set value is within a first set range or not; if not within the first set range, adopting a universal adjustment mode to adjust camera gain, and keeping the brightness adjustment period as the initial adjustment period; if within the first set range, keeping camera gain unchangeable, marking the brightness adjustment period of the camera as the stable period, and thus, before the brightness adjustment period of the camera does not change, and after the camera collects images, indicating that verification results about verifying the brightness adjustment period of the camera are all about the stable period, and ending the initial adjustment period; and if overrun, adopting the universal adjustment mode to adjust camera gain, marking the brightness adjustment period of the camera as the abnormal period, and ending the initial adjustment period.

Figure 4:
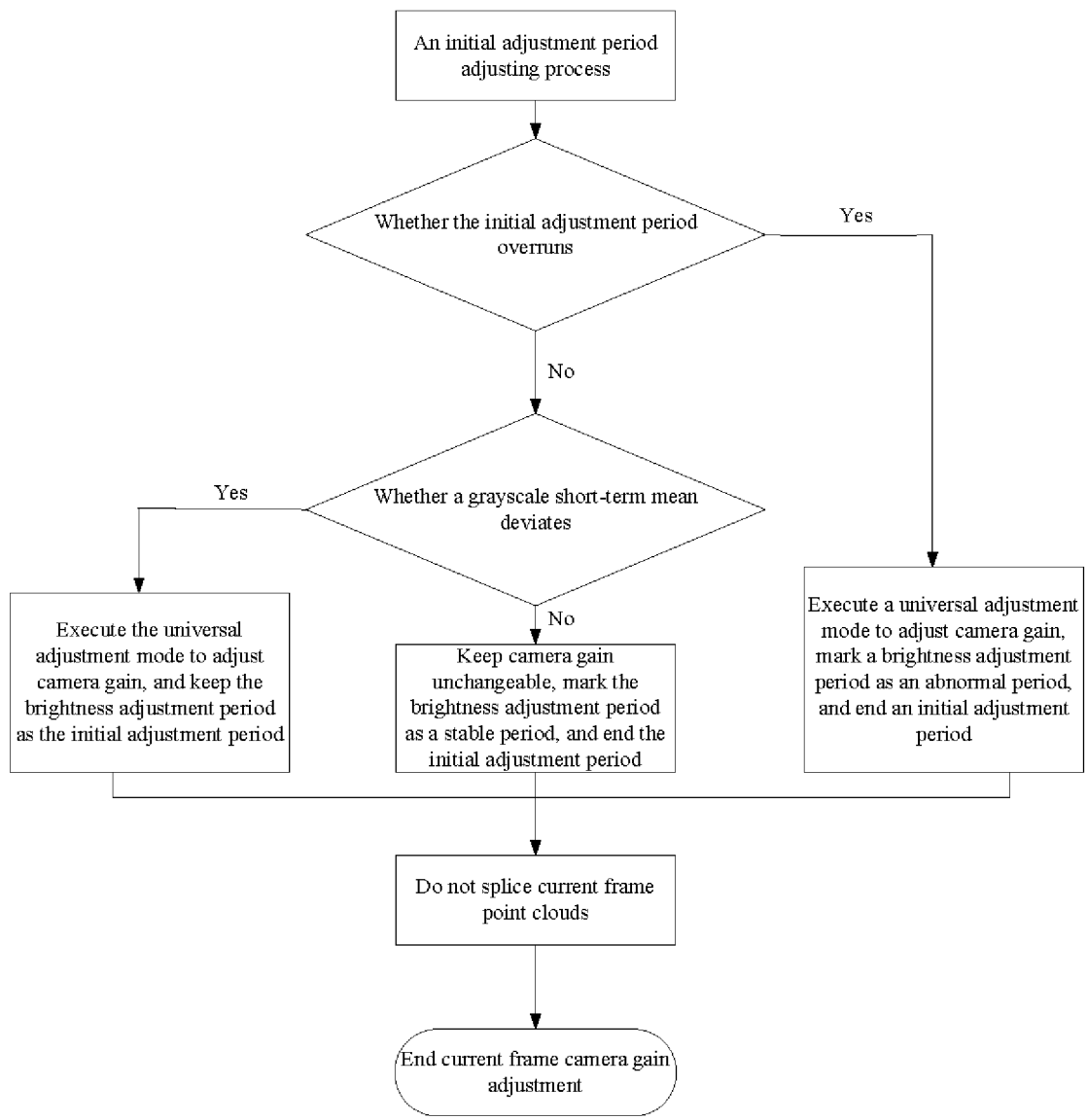
FIG. 4 is a flowchart of an adjusting process in an initial adjustment period in FIG. 3.

Specifically, the foregoing first set value is a preset grayscale short-term mean standard value, and is commonly an empirical value, which is set to be subjected to subtraction with a current grayscale short-term mean. The foregoing first set range refers to a value range of a difference value between the grayscale short-term mean and the first set value, such as [0, 5). As shown in FIG. 4, in the adjusting process in the initial adjustment period, it is verified whether the initial adjustment period duration overruns or not, and if not, it is verified whether the difference value between the grayscale short-term mean and the first set value is within the first set range or not (i.e., whether the grayscale short-term mean deviates or not), such as [0, 5). If not within the first set range (i.e., deviation), the universal adjustment mode is executed to adjust camera gain, the brightness adjustment period is kept as the initial adjustment period, current frame point clouds are not spliced, and current frame camera adjustment is ended; and if within the first set range (i.e., not deviation), camera gain is kept unchangeable, the brightness adjustment period is marked as the stable period, the initial adjustment period is ended, the current frame point clouds are not spliced, and current frame camera gain adjustment is ended.

If overrun, the universal adjustment mode is executed to adjust camera gain, the brightness adjustment period is marked as the abnormal period, the initial adjustment period is ended, the current frame point clouds are not spliced, and current frame camera gain adjustment is ended.

Alternatively, in the foregoing embodiment of the present disclosure, in a case that the brightness adjustment period is the abnormal period, an adjustment mode in the abnormal period is adopted to adjust camera gain. In a case that the brightness adjustment period is the abnormal period, the step of adjusting camera gain in a corresponding brightness adjustment period based on the first calculation result includes: verifying whether the abnormal period overruns or not; if not, verifying whether the difference value between the grayscale short-term mean and the first set value is within the first set range or not (i.e., judging whether the grayscale short-term mean deviates or not): if not within the first set range, adopting the universal adjustment mode to adjust camera gain, where the universal adjustment mode includes: calculating a gain adjustment amount, verifying whether the adjustment amount exceeds a second preset value or not, if the adjustment amount does not exceed the second preset value, not adjusting camera gain, marking the brightness adjustment period as the stable period, and ending the abnormal period and single-frame adjustment; and if the adjustment amount exceeds the second preset value, adjusting camera gain according to a calculation result of the gain adjustment amount, keeping the adjustment period as the abnormal period, and ending single-frame adjustment; if within a second set range, keeping camera gain unchangeable, marking the brightness adjustment period as the stable period, and ending the abnormal period and single-frame adjustment; and if overrun, adopting the universal adjustment mode to adjust camera gain, marking the brightness adjustment period as the stable period, and ending the abnormal period and single-frame adjustment.

Specifically, the second preset value is an adjustment amount threshold, is set to determine whether camera gain needs to be adjusted or not, and is set according to actual adjusting demands, such as 0, which is not limited herein.

Figure 5:
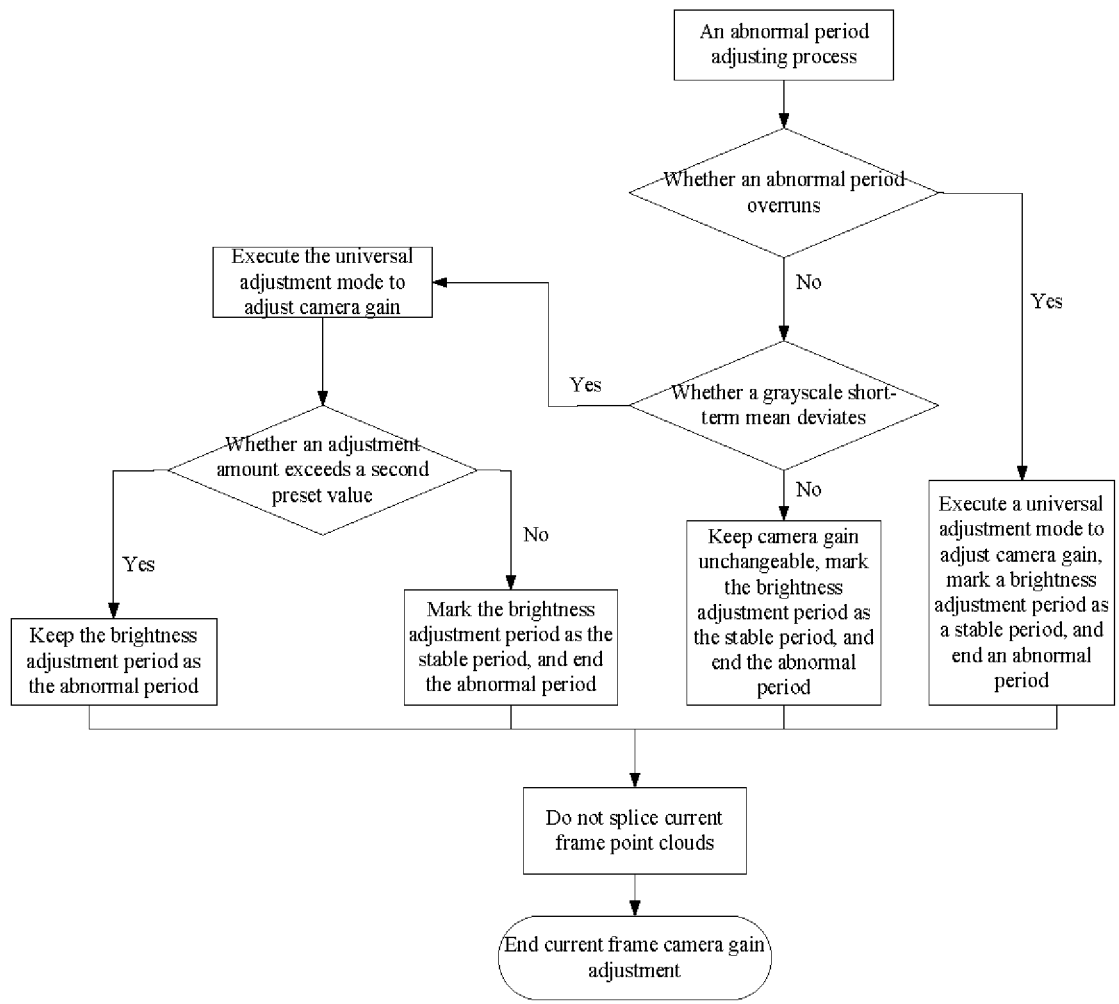
FIG. 5 is a flowchart of an adjusting process in an abnormal period in FIG. 3.

In an optional scheme, as shown in FIG. 5, in a case that the brightness adjustment period is the abnormal period, the adjusting process in the abnormal period is executed, it is verified whether the abnormal period duration overruns or not, and if not, it is verified whether a difference value between the current grayscale short-term mean and the preset grayscale short-term mean standard value (the first set value) exceeds the first set range or not (i.e., judging whether the grayscale short-term mean deviates or not), such as [0, 5): if the difference value exceeds the first set range (i.e., deviation), the universal adjustment mode is executed to adjust camera gain (i.e., executing a universal adjusting strategy), current frame three-dimensional reconstructed point cloud images are not subjected to image splicing, it is verified whether the adjustment amount exceeds the second preset value or not, and the second preset value may be 0, which is decided according to actual situations; when the adjustment amount does not exceed the second preset value, the brightness adjustment period is marked as the stable period (that is, a next frame enters the stable period), the abnormal period is ended, the current frame point clouds are not spliced, and current frame camera gain adjustment is ended; and if the adjustment amount exceeds the second preset value, the brightness adjustment period is kept as the abnormal period, the current frame point clouds are not spliced, and current frame camera gain adjustment is ended; and if the difference value does not exceed the first set range (i.e., not deviation), camera gain is kept unchangeable, the brightness adjustment period is marked as the stable period, the next frame enters the stable period, the abnormal period is ended, the current frame point clouds are not spliced, and current frame camera gain adjustment is ended.

If overrun, the universal adjusting strategy is executed to adjust camera gain, the current frame three-dimensional reconstructed point cloud images are not subjected to image splicing, the brightness adjustment period is marked as the stable period, the next frame enters the stable period, the abnormal period is ended, the current frame point clouds are not spliced, and current frame camera gain adjustment is ended.

Alternatively, in the foregoing embodiment of the present disclosure, in a case that the brightness adjustment period is the stable period, an adjustment mode in the stable period is adopted to adjust camera gain. In a case that the brightness adjustment period is the stable period, the step of adjusting camera gain in a corresponding brightness adjustment period based on the first calculation result includes: verifying whether a difference value between the grayscale long-term mean and a third set value is within a third set range or not (i.e., judging whether the grayscale long-term mean deviates or not): if within the third set range, verifying whether the overexposure point proportion long-term mean exceeds a fourth set value or not; if the fourth set value is exceeded, lowering camera gain, not performing image splicing on the current frame three-dimensional reconstructed point cloud images, keeping the brightness adjustment period as the stable period and ending single-frame adjustment; and if the fourth set value is not exceeded, keeping camera gain unchangeable, performing image splicing on the current frame three-dimensional reconstructed point cloud images, keeping the brightness adjustment period as the stable period and ending single-frame adjustment; if not within the third set range, adopting the universal adjustment mode to adjust camera gain (calculating the gain adjustment amount and verifying whether the adjustment amount exceeds the second preset value or not; if the adjustment amount exceeds the second preset value, reversely adjusting camera gain according to a calculation result of the adjustment amount, and if the adjustment amount does not exceed the second preset value, not adjusting camera gain), and verifying whether the adjustment amount exceeds a fifth set value or not; if the adjustment amount exceeds the fifth set value, marking the brightness adjustment period as the abnormal period, and ending the stable period and single-frame adjustment; and if the adjustment amount does not exceed the fifth set value, keeping the brightness adjustment period as the stable period, and ending single-frame adjustment.

Specifically, the foregoing third set value is a preset grayscale long-term mean standard value (i.e., threshold). The foregoing third set range refers to a value range of a difference value between the grayscale long-term mean and the standard value thereof (i.e., judging whether the grayscale long-term mean deviates or not), such as [0, 5). Specifically, the foregoing fourth set value is a preset overexposure point proportion long-term mean standard value (i.e., threshold), such as 20%. The foregoing fifth set value is a preset threshold of the adjustment amount, and is set to measure whether to adjust the state of the brightness adjustment period. For example, the threshold is 1.

Figure 6:
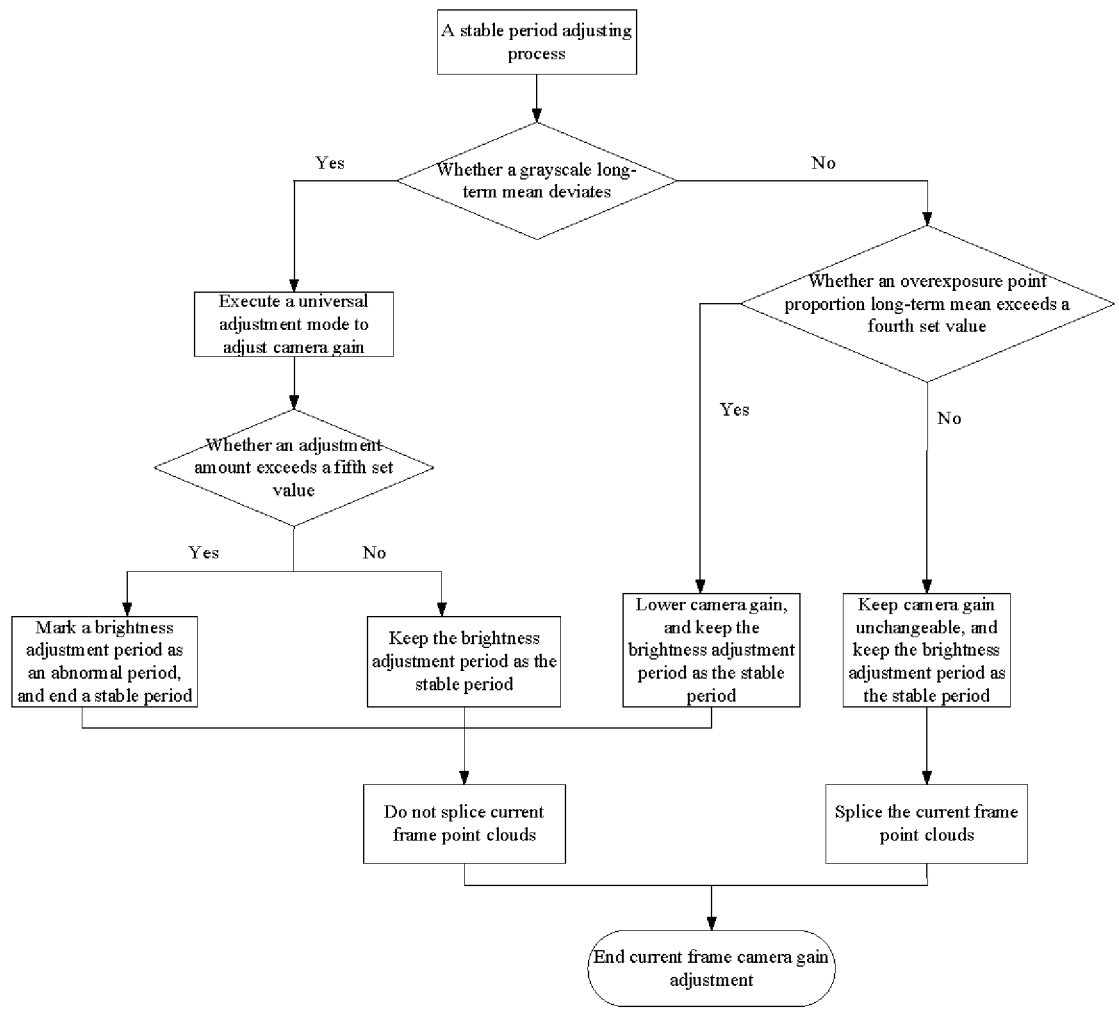
FIG. 6 is a flowchart of an adjusting process in a stable period in FIG. 3.

In an optional scheme, as shown in FIG. 6, in a case that the brightness adjustment period is the stable period, the adjusting process in the stable period is executed, and it is verified whether a difference value between the grayscale long-term mean and the preset grayscale long-term mean standard value (the third set value) exceeds the third set range or not (i.e., judging whether the grayscale long-term mean deviates or not): if not, it is verified whether the overexposure point proportion long-term mean exceeds the fourth set value or not, such as 20%; if the fourth set value is exceeded, camera gain is lowered, for example, a degree of gain is lowered, the current frame three-dimensional reconstructed point cloud images are not subjected to image splicing, the brightness adjustment period is kept unchangeable, thus, the next frame is still in the stable period, and current frame camera gain adjustment is ended; and if the fourth set value is not exceeded, camera gain is kept unchangeable, the current frame three-dimensional reconstructed point cloud images are spliced, the brightness adjustment period is kept as the stable period, thus, the next frame is still in the stable period, and current frame camera gain adjustment is ended; if the difference value exceeds the third set range (i.e., deviation), such as [0, 5), the universal adjustment mode is executed to adjust camera gain, the current frame three-dimensional reconstructed point cloud images are not subjected to image splicing, and it is verified whether the adjustment amount exceeds the fifth set value or not, and for example, the fifth set value is 1; if the adjustment amount exceeds 1, the brightness adjustment period is marked as the abnormal period, the next frame enters the abnormal period, and the stable period and single-frame adjustment are ended; and if the adjustment amount does not exceed 1, the brightness adjustment period is kept unchangeable, and current frame camera gain adjustment is ended.

Alternatively, in the foregoing embodiment of the present disclosure, the step of adjusting camera gain through the universal adjustment mode includes: obtaining an adjustment amount of gain based on a grayscale calculated value and the first set value; verifying whether the adjustment amount is the second preset value or not; if the adjustment amount is the second preset value, keeping camera gain unchangeable; and if the adjustment amount is not the second preset value, reversely adjusting camera gain based on the adjustment amount, lowering gain if the grayscale short-term mean is too high, or otherwise, increasing gain. In this embodiment, when reconstruction succeeds, the grayscale calculated value is preferably the current grayscale short-term mean of the texture pattern, and when reconstruction fails, the grayscale calculated value is preferably the grayscale value of the current frame texture pattern.

Figure 8:
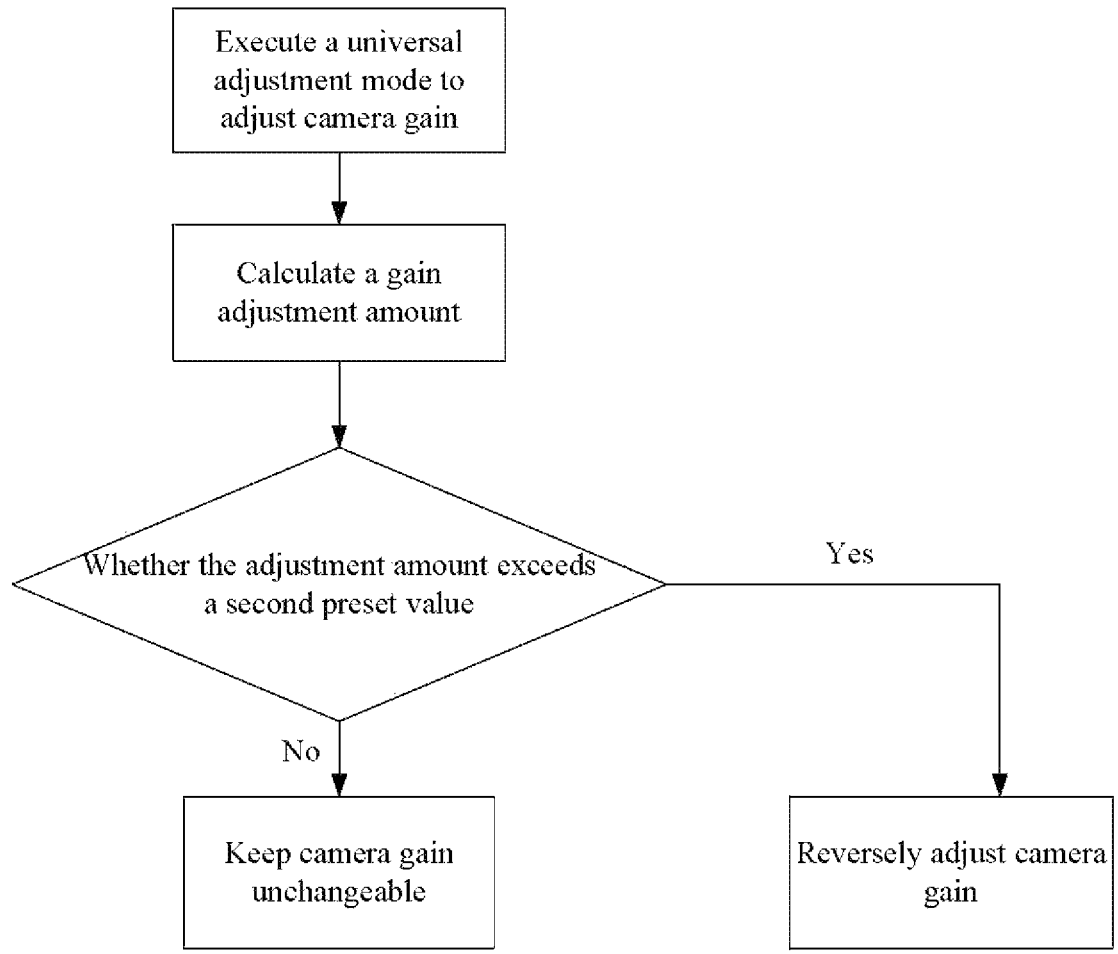
FIG. 8 is a flowchart of an optional universal adjustment mode for adjusting camera gain in FIGS. 4 to 7.

In an optional scheme, as shown in FIG. 8, a process of adjusting camera gain through the universal adjustment mode is as below: calculating an adjustment amount of gain, judging whether the adjustment amount exceeds the second preset value or not, where the second preset value may be 0, which is decided according to actual situations; if the adjustment amount does not exceed the second preset value, keeping camera gain unchangeable; and if the adjustment amount exceeds the second preset value, reversely adjusting camera gain.

Alternatively, in the foregoing embodiment of the present disclosure, before selecting the successful reconstruction region in the current frame image for grayscale calculation, it is judged whether the number of previous frames continuously failing in reconstruction reaches a preset value or not; if yes, removing the first calculation result calculated before, and the first calculation result is re-calculated from the current frame; and if not, the step of selecting the successful reconstruction region in the current frame image for grayscale calculation is directly executed.

In an optional scheme, before selecting the successful reconstruction region in the current frame image for grayscale calculation, it is judged whether the number of previous frames continuously failing in reconstruction reaches the preset value or not; if yes, for example, the number of frames failing in reconstruction is 8, that is, a current scene changes, the first calculation result calculated before needs to be first removed, and then grayscale calculation is started from the current frame; and if not, grayscale calculation is performed based on the current frame image and the first calculation result calculated before, and a first calculation result of the current frame is directly calculated based on the first calculation result of the previous frame. For example, the current frame is a $1000^{th}$ frame, when the number of frames failing in reconstruction is 8 (i.e., the $992^{th}$-$999^{th}$ frames failing in reconstruction), a first calculation result of the current frame and frames behind the current frame (before accumulative 8 times of next unsuccessful reconstruction) starts to be calculated from the $1000^{th}$ frame. For example, a first calculation result of a $1116^{th}$ frame is calculated based on grayscale values of images of $1000^{th}$-$1116^{th}$ frames, or otherwise, the current frame and previous frames are all involved in calculation of the first calculation result. For example, the first calculation result of the $1116^{th}$ frame is calculated based on the grayscale values of the images of $1000^{th}$-$1116^{th}$ frames and grayscale values of images of frames before the $1000^{th}$ frame (after accumulative 8 times of previous unsuccessful reconstruction).

In addition, it needs to be explained that the method for adjusting camera gain further includes: verifying whether the camera is in the initial adjustment period or not at present; if the camera is in the initial adjustment period, adopting the adjustment mode in the initial adjustment period to adjust camera gain; if the camera is not in the initial adjustment period, verifying whether the camera is in the abnormal period or not at present; if the camera is in the abnormal period, adopting the adjustment mode in the abnormal period to adjust camera gain; and if the camera is not in the abnormal period, adopting the adjustment mode in the stable period to adjust camera gain.

Alternatively, in the foregoing embodiment of the present disclosure, if reconstruction fails, a non-dark region in the current frame image is selected for grayscale calculation to obtain a second calculation result, where the second calculation result includes: a grayscale short-term mean and an overexposure point proportion of the current frame image; it is verified whether the number of pixel points in the non-dark region is less than a sixth set value or not; if the number is less than the sixth set value, camera gain is kept unchangeable, and single-frame adjustment is ended; if the number is greater than the sixth set value, it is verified whether the overexposure point proportion exceeds a seventh set value or not, and if the seventh set value is exceeded, the universal adjustment mode is adopted to adjust camera gain; and if the seventh set value is not exceeded, camera gain is kept unchangeable, and single-frame adjustment is ended.

Specifically, the foregoing second calculation result is a result of grayscale calculation performed on the non-dark region in the current frame image during unsuccessful reconstruction. The sixth set value is a preset value of the number of pixel points in a non-dark region in a current frame texture pattern when the current frame image fails in reconstruction. The seventh set value is a preset value of an overexposure point proportion of the current frame texture pattern when the current frame image fails in reconstruction, such as 20%.

Figure 7:
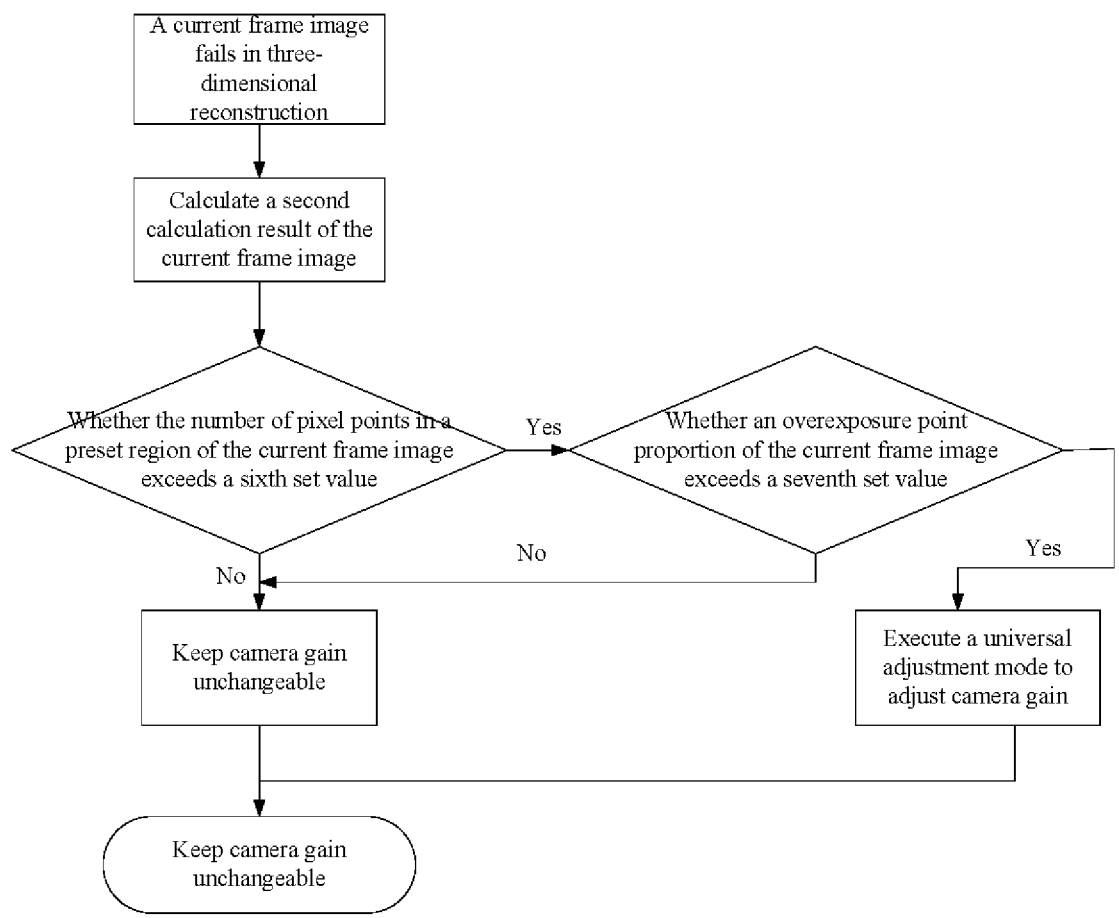
FIG. 7 is a flowchart of an optional method for adjusting camera gain when reconstruction fails in FIG. 2.

In an optional scheme, in combination with FIG. 7, specific implementations in this embodiment are as below: when the current frame image fails in three-dimensional reconstruction, keeping the brightness adjustment period unchangeable, selecting the preset region (i.e., a default region) as the non-dark region in the current frame texture pattern, and calculating a grayscale value and an overexposure point proportion of the current frame texture pattern to obtain a second calculation result (i.e., calculating a second calculation result of the current frame image); verifying whether the number of pixel points in the preset region exceeds the sixth preset value or not; if the sixth preset value is not exceeded, keeping camera gain unchangeable, and ending current frame camera gain adjustment; if the sixth preset value is exceeded, verifying whether the overexposure point proportion exceeds the seventh set value or not, such as 20%, and if the seventh set value is exceeded, executing the universal adjustment mode to adjust camera gain, and ending current frame camera gain adjustment; and if the seventh set value is not exceeded, keeping camera gain unchangeable, and ending current frame camera gain adjustment.

It needs to be explained that when reconstruction fails, if there are too many overexposure points, it indicates that unsuccessful reconstruction is caused by overexposure, and gain should be reduced as soon as possible.

Figure 3:
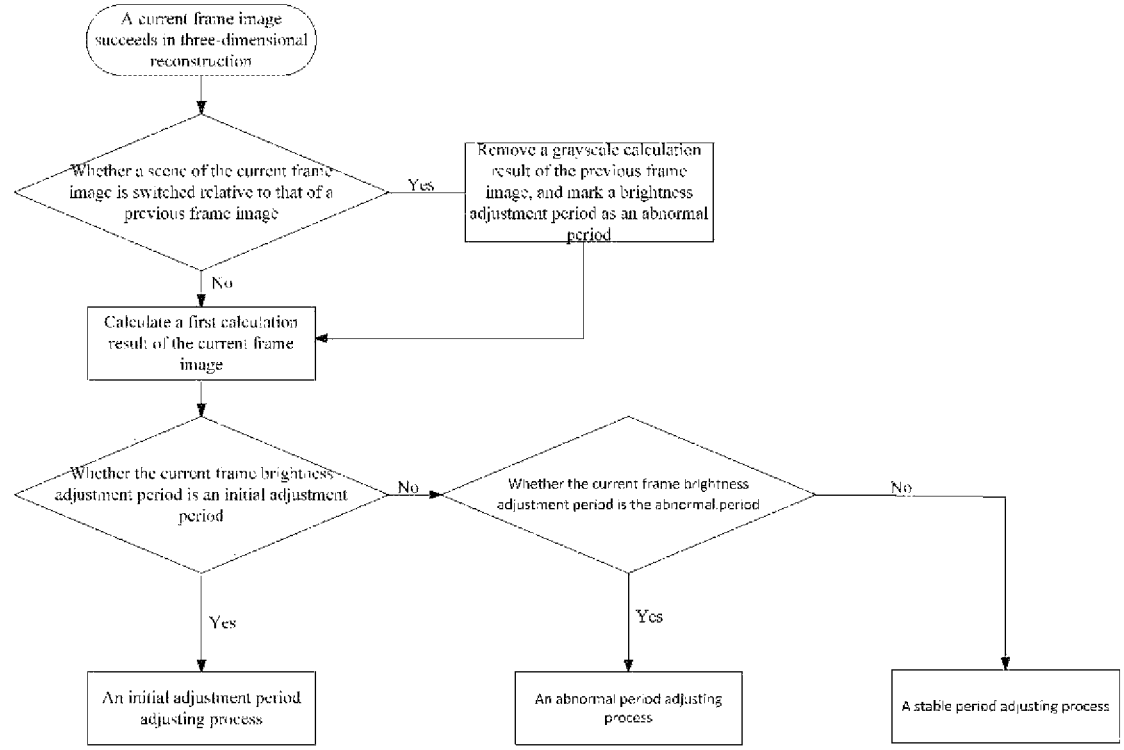
FIG. 3 is a flowchart of an optional process for adjusting camera gain when reconstruction succeeds in FIG. 2.

One feasible implementation process of the foregoing embodiment is as below:
assuming that the reconstruction light is the blue light, an automatic single frame gain adjusting scheme during successful reconstruction is as below:
in combination with FIG. 3, after the current frame image succeeds in three-dimensional reconstruction, it is judged whether a scene of the current frame image is switched relative to a scene of an image of a previous frame or not, if yes, a grayscale calculation result of the image of the previous frame is removed, and the brightness adjustment period is marked as the abnormal period; if not, a first calculation result of the current frame image is calculated, and it is judged whether the current frame brightness adjustment period is the initial adjustment period or not based on the first calculation result; if yes, the adjusting process in the initial adjustment period is performed; if not, it is judged whether the current frame brightness adjustment period is the abnormal period or not; if yes, the adjusting process in the abnormal period is performed; and if not, the adjusting process in the stable period is performed.

1) It is judged whether the scene of the current frame is switched relative to the scene of the previous frame or not; if yes, the brightness adjustment period is directly marked as the abnormal period (i.e., the number of frames continuously failing in reconstruction reaches 8, and the abnormal period is marked), and previous various mean statistics are emptied, that is, the first calculation result calculated before is removed, and the first calculation result is re-calculated accumulatively from the current frame. A switchover judgment standard is as below: whether the number of frames continuously failing in reconstruction reaches 8 or not (8 frames herein do not have particular meaning, which are intended to represent clearance in scene switchover, the number of frames continuously failing in reconstruction not reaching 8 indicates no scene switchover, and there may be another number of frames).

2) If no switchover happens, a grayscale, an overexposure point proportion long-term mean and an overexposure point proportion short-term mean of the current frame are calculated: a reference region is selected as a successful reconstruction region; and a weighted mean of grayscales of three channels of each pixel point of the reference region in the current frame texture pattern is solved, where weights occupied by red channel brightness, green channel brightness and blue channel brightness are 0.25, 0.25 and 0.5 respectively (the core concept of the procedure is that a weight occupied by a texture channel corresponding to the reconstruction light is far greater than weights occupied by the other two channels, so as to embody importance of the reconstruction pattern), and a new grayscale image is obtained which is only an intermediate result facilitating following calculation.

A mean of all pixel points in a reference region of the newly-obtained grayscale image is calculated to serve as a grayscale value of the current frame image (set as a brightness mean of the reference region to measure brightness), and a proportion (i.e., the overexposure point proportion) of the overexposure point number (brightness exceeding the preset value) to the pixel points in the reference region is calculated.

The foregoing values are respectively added to calculate a corresponding long-term mean (previous continuous 160 frames including the current frame, which succeed in reconstruction, and 160 may be replaced with other number as long as features of "long-term mean" are represented, and a short-term mean is in a similar way) and the short-term mean (previous continuous 3 frames, and when the number of frames is insufficient, a mean is selected with a current frame number as a standard, for example, when there are only 100 frames, the long-term mean is calculated by selecting data of previous 100 frames, and the short-term mean is in a similar way), and a grayscale long-term mean, a grayscale short-term mean and an overexposure point proportion long-term mean are obtained.

3) It is verified which one of the initial adjustment period (a period of time when scanning starts), the abnormal period and the stable period is the adjustment period in.

4) An adjusting strategy in the initial adjustment period:

If in the initial adjustment period: it is verified whether the initial adjustment period overruns or not: if not, it is judged whether the grayscale short-term mean deviates or not: if deviation, camera gain is adjusted according to the universal adjusting strategy, the brightness adjustment period is kept as the initial adjustment period, current frame point clouds are not spliced, and single-frame adjustment is ended; and if not, camera gain is kept unchangeable, the current frame point clouds are not spliced, the brightness adjustment period is marked as the stable period, and single-frame adjustment is ended; and if overrun, camera gain is adjusted according to the universal adjusting strategy, the current frame point clouds are not spliced, the brightness adjustment period is marked as the abnormal period (the next frame enters the abnormal period), and single-frame adjustment and the initial adjustment period are ended.

5) An adjusting strategy in the abnormal period:

If in the abnormal period: it is verified whether the abnormal period does not overrun all the time or not:

if not overrun, it is verified whether the grayscale short-term mean deviates exceeding the set value or not: if deviation exceeding the set value, camera gain is adjusted according to the universal adjusting strategy, the current frame point clouds are not spliced, and it is verified whether the adjustment amount is 0 or not: if the adjustment amount is 0, the brightness adjustment period is marked as the stable period (i.e., the next frame enters the stable period), and the abnormal period and single-frame adjustment are ended; and if the adjustment amount is not 0, the brightness adjustment period is kept unchangeable, and single-frame adjustment is ended; and if deviation not exceeding the set value, camera gain is kept unchangeable, the current frame point clouds are not spliced, the brightness adjustment period is marked as the stable period (i.e., the next frame enters the stable period), and the abnormal period and single-frame adjustment are ended; and if overrun, camera gain is adjusted according to the universal adjusting strategy, the current frame point clouds are not spliced, the brightness adjustment period is marked as the stable period (i.e., the next frame enters the stable period), and the abnormal period and single-frame adjustment are ended.

6) An adjusting strategy in the stable period:

If in the stable period: it is verified whether the grayscale long-term mean deviates exceeding the set value or not: if deviation not exceeding the set value, it is verified whether the overexposure point proportion long-term mean deviates exceeding the set value or not: if deviation exceeding the set value, a degree of gain is lowered, the current frame point clouds are not spliced, the brightness adjustment period is kept unchangeable (the next frame is still in the stable period), and single-frame adjustment is ended; and if deviation not exceeding the set value, camera gain is kept unchangeable, the current frame point clouds are spliced, the brightness adjustment period is kept unchangeable (the next frame is still in the stable period), and single-frame adjustment is ended; and if deviation exceeding the set value, camera gain is adjusted according to the universal adjusting strategy, the current frame point clouds are not spliced, and it is verified whether the adjustment amount exceeds 1 or not: if the adjustment amount exceeds 1, the brightness adjustment period is marked as the abnormal period (i.e., the next frame enters the abnormal period), and the stable period and single-frame adjustment are ended; and if the adjustment amount does not exceed 1, the brightness adjustment period is kept unchangeable, and single-frame adjustment is ended.

An automatic single frame gain adjusting scheme during unsuccessful reconstruction is as below:

the current frame fails in reconstruction, the brightness adjustment period is kept unchangeable, the reference region is selected as the non-dark region in the whole image, and the grayscale value and the overexposure point proportion of the current frame texture pattern are calculated; it is verified whether the number of the pixel points in the reference region is less than the set value or not, and if the number is less than the set value, single-frame adjustment is ended; and if the number is greater than the set value, it is verified whether the overexposure point proportion exceeds 20% or not: if yes, the universal adjusting strategy is executed to adjust camera gain (the gain adjustment amount is calculated, the gain adjustment amount=(the grayscale value of the current frame texture pattern–the first set value)/15, it is verified whether the adjustment amount is the second preset value or not; if the adjustment amount is the second preset value, camera gain is kept unchangeable; and if the adjustment amount is not the second preset value, camera gain is reversely adjusted based on the adjustment amount, gain is lowered if the grayscale value is too high, or otherwise, gain is increased), and single-frame adjustment is ended; and if not, single-frame adjustment is ended.

Embodiment 2

According to the embodiment of the present disclosure, a device for adjusting camera gain is provided. Specific implementations in this embodiment are identical or similar to those in preferred embodiments and the foregoing embodiments, which are not repeated herein.

Figure 9:
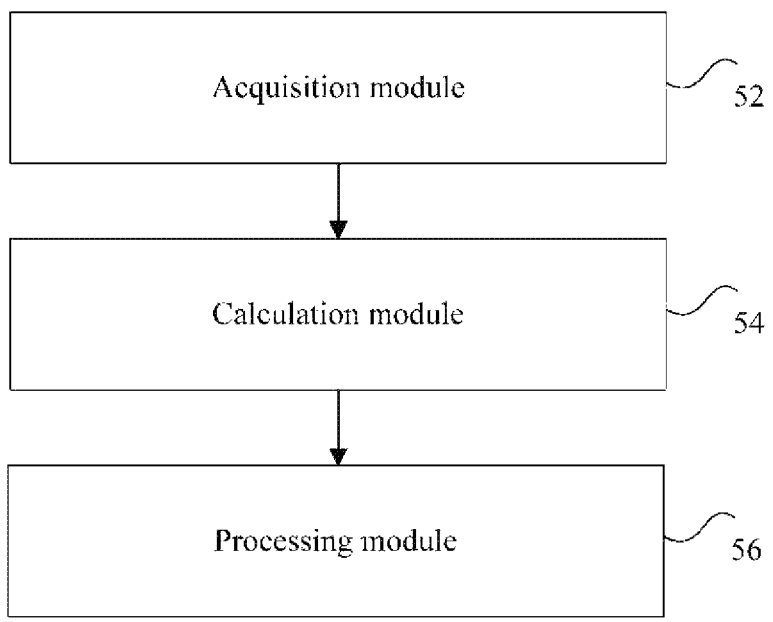
FIG. 9 is a schematic diagram of an device for adjusting camera gain according to an embodiment of the present disclosure.

FIG. 9 is a schematic diagram of a device for adjusting camera gain according to an embodiment of the present disclosure. As shown in FIG. 9, the device includes:

an acquisition module 52 configured to collect a current frame image of a to-be-detected object;

a calculation module 54 configured to select a preset region in the current frame image for grayscale calculation to obtain a first calculation result; and a processing module 56 configured to adjust camera gain in a corresponding brightness adjustment period based on the first calculation result.

Embodiment 3

According to another aspect of the embodiment of the present disclosure, a scanning system is further provided. Specific implementations in this embodiment are identical or similar to those in preferred embodiments and the foregoing embodiments, which are not repeated herein.

Figure 10:
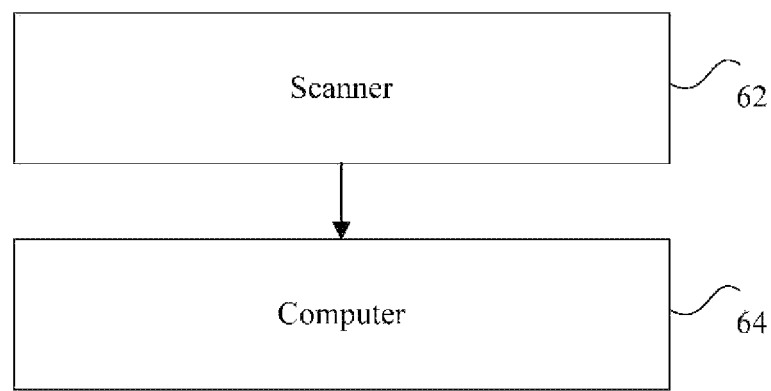
FIG. 10 is a schematic diagram of a scanning system according to an embodiment of the present disclosure.

FIG. 10 is a schematic diagram of a scanning system according to an embodiment of the present disclosure. As shown in FIG. 10, the scanning system includes:

- a scanner 62 including a projector and a camera, where the projector is configured to project monochromatic light to a to-be-detected object, the camera is configured to collect a reconstruction pattern and a texture pattern of the to-be-detected object according to first gain,
- specifically, the foregoing first gain refers to camera gain set before the camera collects images of the to-be-detected object, or default gain of the camera; and
- a computer 64 which is connected to the camera, and is configured to perform three-dimensional reconstruction based on the reconstruction pattern and the texture pattern, perform grayscale calculation based on the reconstruction pattern and the texture pattern to obtain a first calculation result and determine adjusted second gain based on the first calculation result in a corresponding brightness adjustment period. The camera is further configured to collect a reconstruction pattern and a texture pattern of the to-be-detected object according to the second gain.

In an optional embodiment, the brightness adjustment period of the to-be-detected object can be determined based on the first calculation result, camera gain (i.e., the foregoing first gain) is adjusted according to different camera gain adjusting manners in different periods to obtain second gain (adjusted gain) so that the camera can adopt the second gain (the adjusted gain) to shoot the to-be-detected object to obtain a new reconstruction pattern and a new texture pattern based on which three-dimensional reconstruction is performed.

Embodiment 4

According to another aspect of the embodiment of the present disclosure, a computer-readable storage medium is further provided and includes stored programs. The programs, when operating, control a device where the storage medium is located to execute the method for adjusting camera gain according to any foregoing embodiment.

Embodiment 5

According to another aspect of the embodiment of the present disclosure, a processor is further provided and configured to operate programs. The programs, when operating, execute the method for adjusting camera gain according to any foregoing embodiment.

The serial numbers of the above embodiments of the present disclosure are merely used for descriptions instead of representing good or bad of the embodiments.

In the above embodiments of the present disclosure, special emphasis is laid on a description of each embodiment, and for parts not described in detail in one embodiment, please refer to related descriptions in other embodiments.

It is to be understood that technical contents disclosed by the several embodiments provided by the embodiments of the disclosure may be implemented by other manners. The above described embodiments of a device is merely schematic, such as unit division which may be logic function division; and during practical implementation, there may be additional division manners, for example, a plurality of units or components may be combined or integrated into another system, or some characteristics may be ignored or not executed. In addition, shown or discussed mutual coupling or direct coupling or communication connection may be realized through some interfaces, and unit or module indirect coupling or communication connection may be in an electrical form or other forms.

Units described as separation parts may be or may be not physically separated, and parts for unit display may be or may be not physical units, may be located at the same position, or may be distributed on a plurality of units. Part or all of the units may be selected according to actual demands to achieve objectives of the schemes of the embodiments.

In addition, functional units in the embodiments of the present disclosure may be integrated in one processing unit, or independently and physically exist, or two or more units may be integrated in one unit. The above integrated unit may be realized in a hardware form or a form of a software functional unit.

When the integrated unit is realized in the form of the software functional unit and serves as an independent product to be sold or used, the integrated unit may be stored in the computer-readable storage medium. Based on the understanding, the technical schemes of the present disclosure essentially or parts making contribution to the prior art or all or part of the technical schemes may be embodied in a software product form. A computer software product is stored in a storage medium and includes a plurality of instructions for making a computer device (a personal computer, a server, or a network device, or the like) perform all or part of the steps of the methods in the embodiments of the present disclosure. The foregoing storage medium includes a U disk, a Read-Only Memory (ROM), a Random Access Memory (RAM), a mobile hard disk, a diskette or a light disk or other media capable of storing program code.

The above contents are merely preferred implementations of the present disclosure. It needs to be indicated that a plurality of improvements and embellishments may be made by those of ordinary skill in the art without departing from the principle of the present disclosure and should fall within the scope of protection of the present disclosure.

INDUSTRIAL APPLICABILITY

The schemes provided by the embodiments of the disclosure may be used for obtaining a real object image of the to-be-detected object through scanning so that gain adjustment can be kept highly matched with the scene and a rapid response can be made to scene changes, and accordingly, a scanning result is consistent to texture of a real object, thereby achieving the purposes of improving camera gain adjusting flexibility and improving the gain adjusting rate and the adjustment effect; and thus, the image scanning quality is improved, the scanning result accuracy is improved, and the technical problems that in the related technologies, the method for adjusting camera gain is poor in flexibility, resulting in inaccurate scanning result are solved.

What is claimed is:

1. A method for adjusting camera gain, comprising:
collecting a current frame image of a to-be-detected object;
selecting a preset region in the current frame image for grayscale calculation to obtain a first calculation result; and
adjusting camera gain in a camera gain adjusting manner corresponding brightness adjustment period based on the first calculation result, wherein different brightness adjustment periods correspond to respective camera gain adjusting manners;
wherein the preset region is a successful reconstruction region in the current frame image, and before the selecting the preset region in the current frame image for grayscale calculation, the method further comprises: performing three-dimensional reconstruction on the current frame image of the to-be-detected object; and in response to that reconstruction succeeds, selecting a successful reconstruction region in the current frame image for grayscale calculation to obtain the first calculation result;
wherein the selecting the successful reconstruction region in the current frame image for grayscale calculation to obtain the first calculation result comprises: obtaining a grayscale image of the current frame image based on a grayscale value of each pixel point in the successful reconstruction region in the current frame image, wherein the grayscale value is a weighted mean of grayscale values of three channels of each pixel point; calculating a grayscale mean of all the pixel points in the preset region in the grayscale image, and counting a target quantity of the pixel points with the grayscale value greater than a first preset value in the successful reconstruction region; and obtaining the first calculation result based on the grayscale mean of all the pixel points and the target quantity, wherein the first calculation result comprises: a current grayscale long-term mean, a grayscale short-term mean and an overexposure point proportion long-term mean of the image.

2. The method as claimed in claim 1, wherein a weighted value corresponding to a target channel in the three channels is greater than weighted values corresponding to the other two channels, and the target channel is a channel corresponding to reconstruction light projected to the to-be-detected object.

3. The method as claimed in claim 1, wherein the brightness adjustment period comprises one of an initial adjustment period, a stable period and an abnormal period, and corresponding adjustment modes are adopted in the different brightness adjustment periods to adjust camera gain, wherein in response to that a scene in the current frame image changes, the brightness adjustment period is marked as the abnormal period.

4. The method as claimed in claim 3, wherein in a case that the brightness adjustment period is the initial adjustment period, the adjusting camera gain in the corresponding brightness adjustment period based on the first calculation result comprises:
verifying whether the initial adjustment period overruns;
in response to that the initial adjustment period does not overruns, verifying whether a difference value between the grayscale short-term mean and a first set value is within a first set range;
in response to that the difference value between the grayscale short-term mean and the first set value is not within the first set range, adopting a universal adjustment mode to adjust camera gain, and keeping the brightness adjustment period as the initial adjustment period;
in response to that the difference value between the grayscale short-term mean and the first set value is within the first set range, keeping camera gain unchangeable, marking the brightness adjustment period as the stable period, and ending the initial adjustment period; and
in response to that the initial adjustment period overruns, adopting the universal adjustment mode to adjust camera gain, marking the brightness adjustment period as the abnormal period, and ending the initial adjustment period.

5. The method as claimed in claim 3, wherein in a case that the brightness adjustment period is the abnormal period, the adjusting camera gain in the corresponding brightness adjustment period based on the first calculation result comprises:
verifying whether the abnormal period overruns;
in response to that the abnormal period does not overruns, verifying whether a difference value between the grayscale short-term mean and a first set value is within a first set range:
in response to that the difference value between the grayscale short-term mean and the first set value is not within the first set range, adopting a universal adjustment mode to adjust camera gain, and verifying whether an adjustment amount exceeds a second preset value or not;
in response to that the adjustment amount does not exceed the second preset value, marking the brightness adjustment period as the stable period, and ending the abnormal period;
in response to that the adjustment amount exceeds the second preset value, keeping the brightness adjustment period as the stable period;
in response to that the difference value between the grayscale short-term mean and the first set value is within the first set range, keeping camera gain unchangeable, marking the brightness adjustment period as the stable period, and ending the abnormal period; and
in response to that the abnormal period overruns, adopting the universal adjustment mode to adjust camera gain, marking the brightness adjustment period as the stable period, and ending the abnormal period.

6. The method as claimed in claim 3, wherein in a case that the brightness adjustment period is the stable period, the adjusting camera gain in the corresponding brightness adjustment period based on the first calculation result comprises:
verifying whether a difference value between the grayscale long-term mean and a third set value is within a third set range:
in response to that the difference value between the grayscale long-term mean and the third set value is within the third set range, verifying whether the overexposure point proportion long-term mean exceeds a fourth set value;
in response to that the fourth set value is exceeded, lowering camera gain, and keeping the brightness adjustment period as the stable period;
in response to that the fourth set value is not exceeded, keeping camera gain unchangeable, and keeping the brightness adjustment period as the stable period;

in response to that the difference value between the grayscale long-term mean and the third set value is not within the third set range, adopting a universal adjustment mode to adjust camera gain, and verifying whether an adjustment amount exceeds a fifth set value;

in response to that the adjustment amount exceeds the fifth set value, marking the brightness adjustment period as the abnormal period, and ending the stable period; and in response to that the adjustment amount does not exceed the fifth set value, keeping the brightness adjustment period as the stable period.

7. The method as claimed in claim 4, wherein the adopting the universal adjustment mode to adjust camera gain comprises:

obtaining an adjustment amount of gain based on the grayscale short-term mean and the first set value;

verifying whether the adjustment amount is the second preset value;

in response to that the adjustment amount is the second preset value, keeping camera gain unchangeable; and in response to that the adjustment amount is not the second preset value, reversely adjusting camera gain based on the adjustment amount.

8. The method as claimed in claim 1, wherein before selecting the successful reconstruction region in the current frame image for grayscale calculation, it is judged whether the number of previous frames continuously failing in reconstruction reaches the preset value; in response to that the number of previous frames continuously failing in reconstruction reaches the preset value, after the first calculation result calculated before is removed, grayscale calculation is started from the current frame image; and in response to that the number of previous frames continuously failing in reconstruction does not reach the preset value, grayscale calculation is performed based on the current frame image and the first calculation result calculated before.

9. The method as claimed in claim 1, wherein in response to that reconstruction fails, a non-dark region in the current frame image is selected for grayscale calculation to obtain a second calculation result comprising a grayscale value and an overexposure point proportion of the current frame image;

it is verified whether the number of pixel points in the non-dark region is less than a sixth set value;

in response to that the number is less than the sixth set value, camera gain is kept unchangeable; and in response to that the number is greater than the sixth set value, it is verified whether the overexposure point proportion exceeds a seventh set value:

in response to that the seventh set value is exceeded, a universal adjustment mode is adopted to adjust camera gain; and in response to that the seventh set value is not exceeded, camera gain is kept unchangeable.

10. A non-transitory computer-readable storage medium, comprising stored programs, wherein the programs, when operating, control a device where the storage medium is located to execute the method for adjusting camera gain as claimed in claim 1.

11. A processor, configured to operate programs, wherein the programs, when operating, execute the method for adjusting camera gain as claimed in claim 1.

12. The method as claimed in claim 1, the first preset value is a grayscale threshold, the overexposure points refer to pixel points with grayscale values greater than the first preset value in the pixel points in the current frame image, where the number of the overexposure points is the target quantity.

13. The method as claimed in claim 1 the current frame image comprises a reconstruction pattern and a texture pattern, the reconstruction pattern is stripe pattern, wherein the reconstruction is configured to reconstruct point cloud on the surface of the to-be-detected object;

the texture pattern is synthesized by grayscale images of three channels of the camera, wherein the texture pattern is configured to reconstruct texture on the surface of the to-be-detected object.

* * * * *